(12) United States Patent
Doraisamy et al.

(10) Patent No.: US 7,590,986 B1
(45) Date of Patent: Sep. 15, 2009

(54) METHODS AND APPARATUS SUPPORTING ACCESS TO MULTIPLE DEVICES VIA A PSEUDO DEVICE DRIVER

(75) Inventors: Raja Doraisamy, Fremont, CA (US); Timothe P. Hockin, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1150 days.

(21) Appl. No.: 10/881,552

(22) Filed: Jun. 30, 2004

(51) Int. Cl.
*G06F 9/54* (2006.01)
*G06F 3/00* (2006.01)
(52) U.S. Cl. ........................ 719/321; 710/38
(58) Field of Classification Search ................ 719/321; 710/1, 38; 709/220
See application file for complete search history.

(56) References Cited

U.S. PATENT DOCUMENTS

| | | | |
|---|---|---|---|
| 5,452,460 A * | 9/1995 | Distelberg et al. | 719/321 |
| 6,314,460 B1 * | 11/2001 | Knight et al. | 709/220 |
| 7,296,076 B1 * | 11/2007 | Portolani | 709/227 |
| 2004/0205258 A1 * | 10/2004 | Wilson et al. | 710/1 |

* cited by examiner

*Primary Examiner*—Li B Zhen
*Assistant Examiner*—Abdou K Seye
(74) *Attorney, Agent, or Firm*—Brooks Kushman P.C.

(57) ABSTRACT

A method, apparatus and computer program product for providing a device includes incorporating a session ID into the device name. Communication between an application and device is done by way of a pseudo device driver which identifies the appropriate daemon based on the session id, and forwards the data to the daemon where the daemon provides the data to the device. In operations, the system detects a requirement to access a device during a user session and obtains a session identification associated with the user session. A daemon creates a single device node having an identity that indicates the session identification associated with the user session and a pseudo device driver receives a request to access a device from an application associated with the user session. The device driver parses the request to identify the daemon associated with the user session to process the request based on the session identification indicated within the identity of the device as specified in the request to access the device, and then forwards the request to the identified daemon to allow the application to access the device via the single device node.

21 Claims, 3 Drawing Sheets

METHODS AND APPARATUS SUPPORTING ACCESS TO MULTIPLE DEVICES VIA A PSEUDO DEVICE DRIVER

BACKGROUND

In conventional computer systems that utilize the Linux operating system, a user session may include operation of a user application that requests access to a device installed within the computer system. In doing so, the user application generates a system call request to access the device that is directed to the Linux operating system.

During device installation within a conventional Linux-based operating system, the Linux operating system assigns the device a major identification (ID) number to identify the device type and minor ID number to identify which device of the device type is to be used. The system call request is then forwarded to the appropriate device using the device's major and minor device ID numbers. In such a manner communication between the device and the user application is accomplished. In conventional Linux then, a device is typically allocated by way of a major number and an associated minor number. The major number is used to indicate the device type. For example, a major number of 14 indicates that the device is an audio type device. The minor number indicates which device and the function. For example a major number of 14 with a minor number of 0 with OSS (Open Sound Standard) device driver would indicate the first audio mixer device, and minor number 16 indicates $2^{nd}$ audio mixer device, 32 indicates $3^{rd}$ mixer device and so on. Likewise minor number 3 indicates dsp0 (audio device), minor number 19 indicates dsp1, etc.

SUMMARY

Conventional mechanisms for allocating devices in an operating system such as Linux (kernel version 2.4), such as the examples explained above, suffer from a variety of problems or deficiencies. One such problem is that in conventional systems running the Linux Operating System (e.g., version 2.4 of Linux), minor device numbers are limited to a maximum number ranging between 0 and 255, thus allowing a maximum of 256 minor devices per major device number. This creates a problem in that for certain applications that operate in the Linux environment, it may be desirable to utilize a large number (i.e., >256) of devices of a certain device type. However, due to the maximum number of 256 minor numbers for devices, the number of devices required of a certain type (i.e., corresponding to a specific major device ID) may be more than is allowed. As such, a user application using a conventional implementation of the Linux operating system is limited to accessing no more than 256 devices associated with a specific major device number. Furthermore, in some situations, each device that an application is to access may be required to allocate or utilize a predetermined quantity of minor device numbers. As an example, when each device uses 16 minor numbers, the Linux operating system is limited to having only 16 devices of a particular device type accessible to user applications.

Embodiments of the invention significantly overcome such deficiencies and provide mechanisms and techniques that provide for a greater number of devices for device types within an operating system such as Linux that uses a major/minor device-numbering scheme with limitations placed on the number of minor devices that may be assigned.

In particular, embodiments of the invention operate within an operating system such as Linux that uses a major and minor device numbering scheme. Embodiments of the invention provide a combination of a user session daemon and a pseudo device driver that collectively operate to overcome the conventional Linux limitation of having a limited number of minor device number assignments for any particular major device identification.

In one example implementation, a pseudo device driver configured in accordance with embodiments of the invention is installed within an operating system kernel such as the Linux operating system. In addition, a user session daemon is installed that will operate in conjunction with the pseudo device driver as explained herein. As an example operation, when a user logs into a computer system equipped with embodiments of the invention and initiates a user session, the user session daemon is started in order to receive access requests for the device (i.e., the audio device in this example) from a user application executing within the user session.

During startup of the user session daemon, the daemon provides a request for a session identification (ID) to the pseudo device driver operating within Linux kernel. The pseudo device driver receives the session ID request from the user session daemon and consults a session identification data structure (e.g., a bitmap, table or other data structure) to find a next available unused session identification number to be associated with this user session daemon. The pseudo device driver thus selects the next unused session identification number and marks this value as now being "in use" by the requesting daemon within the session identification data structure. As an example, if the next available or unused session identification were the value "1234", the pseudo device driver would assign the user session the 1234 session Id and would associated the requesting user session daemon to the session ID 1234. In addition, the pseudo device driver creates a set of session structures for use when processing requests for access to devices associated with the session (e.g., the session structures are used for processing audio device access requests). Thereafter, the pseudo device driver returns the session ID back to the user session daemon.

The user session daemon receives the session ID from the pseudo device driver and proceeds to create a device node within device directory used for storing device nodes (i.e., devices in the Linux device directory) of the type associated with the user session daemon. As an example, if the user session daemon controls access to audio devices on behalf of user applications operating within the user session, the user session daemon creates a single device node in the audio device directory having a device node name that includes the session id. As an example, for an audio device, the user session daemon can create a device node (also referred to as a device name) /dev/audio/ut_audio__1234, where the "1234" part of the device name is the session id assigned to the user session daemon from the pseudo device driver. Creation of the device name can use the major device number associated with the type of device being controlled (e.g., 14 for audio devices) and can use any minor device number. In addition, the user session daemon applies any user permissions associated with the user session to the newly create device and further establishes or sets environment variables associated with the session to identify the new device to any user applications operating within the user session. An example, if user applications expect to access audio devices by using the environment variable "AUDIO", then the user session daemon sets the environment variable "AUDIO" to be equivalent to device node /dev/audio/ut_audio__1234. Note that the user session daemon can use this device over and over no matter how many devices a particular user application may require. As an example, if a particular user application required 500 audio devices, the user session daemon could establish 500 different environment variables "AUDIO_1" ... "AUDIO_500" and can assign each one to the same Linux device node /dev/audio/ut_audio_1234.

Once this configuration phase is completed, user applications operating within the user session can execute system calls for access to devices associated with the user session daemon via the appropriate user session environment variables. As an example, the user application can initiate a request to the Linux kernel to open and access a first audio device AUDIO1 (equal to device node /dev/ut_audio_1234) via referencing the environment variable AUDIO1. As part of the system call, the user application specifies the major and minor device number (14,1) that were assigned to this device upon the creation of the device by the user session daemon. When the Linux kernel receives such a request, the kernel finds the device driver associated with the requesting device, which in this case is the pseudo device driver, and passes control to the pseudo device driver operating in accordance with embodiments of the invention. The pseudo device driver receives the system call and is able to examine the system call made by the user application to identify the device name /dev/audio/ut_audio_1234. By parsing this device name, the pseudo device driver is able to identify the session identification number is "1234" and is able to use this session identification number to identify the appropriate user session daemon to process the user application system request for access to the device. In other words, since the device access request made by a user application identifies a device by device name and has the session identification encoded within the device name, the pseudo device driver is able to identify which user session and hence which user session daemon will be processing requests for the particular device. Accordingly, the pseudo device driver responds to the kernel and the Linux kernel establishes a connection between the pseudo device driver and the requesting application such that the requesting application can access the device (e.g., by reading and writing data to or from the device via the pseudo device driver). Any data sent to or from the pseudo device driver by the user application is forwarded to the appropriate user session daemon (identified by the session id encoded within the device name) and the user session daemon is able to access to device based on the data received from the pseudo device driver.

In this manner, embodiments of the invention are able to provide a user session daemon that only creates a single actual Linux device node within the Linux device directory and that encodes within the device name the session identification associated with the user session. Thereafter, the user session daemon can establish or associate any number of system environment variables for any number of pseudo devices for use by user applications for access to any number of devices. Since each environment variable references the same actual Linux device (i.e., major 14, minor 1) and this device name (i.e., /dev/audio/ut_audio_1234) includes the session identification formerly established between the user session daemon and the pseudo device driver, any user application system requests for access to these devices from the user applications are directed to the same pseudo device driver which can, based upon the device name, map the device access request back the appropriate user session daemon via the session ID data structure maintained by the pseudo device driver. Accordingly, any number of devices may now be requested for access by user applications and the conventional Linux limitation of 256 devices associated with a particular device type is overcome by embodiments of the invention.

In a particular embodiment, the system operates to detect a requirement to access a device during a user session. This may simply be the daemon being started upon the creation of the user session. The daemon then operates to obtain a session identification associated with the user session via a request placed to the pseudo device driver. Upon receipt of the session ID, the daemon creates a single device node (i.e., an actual device file in the Linux operating system) having an identity that indicates the session identification associated with the user session. This establishes a relationship between the user session and the device node. Thereafter, the operating system executes a user application and at some point, the user application will make a a request to access a device. From the applications perspective, there may be many hundreds of available devices and each may be accessible, for example, by referencing a separate environment variable name.

In particular, in some cases the application may requires access to a number of separate devices of a predefined type (e.g., having the same major device number) that exceeds a number of devices that can be created (i.e., that have a minor number) of a predefined type allowed by an operating system supporting the user session. As an example, an application may require use of and access to 1000 devices of the same major number (i.e., of the same device type). To support this, in operation of the invention, the pseudo device driver receiving the request for access to a device (or receives all 1000 requests for access by the application to each of the 1000 apparent devices) and parses the request to identify a daemon associated with the user session to process the request based on the session identification indicated within the identity of the device as specified in the request to access the device. As an example, if there were 1000 audio devices, each having an environment variable AUDIO1 ... AUDIO 1000, each would have been associated with the same device /dev/audio/ut_audio_1234 when those environment variable were established by the daemon as session startup. As such, the application might request to open and write data to each of these. The pseudo device driver operates to parse each request for access to the number of separate devices (i.e., the 1000 apparently different audio devices, from the applications perspective) such that each request from the application is mapped to the same session identification (i.e., 1234) associated with the user session and thus identifies a single daemon (i.e., the daemon that created the single actual device node /dev/audio/ut_audio_1234) in the operating system device directory associated with the user session to process the requests for access to each of the number of separate devices via the single device. Each request is then forwarded by the pseudo device driver to the identified daemon to allow the application to access the device(s) via the single device node.

In this manner, the daemon only needs to create one actual device node per session wherein the device node points to the same device, and applications can be presented with the appearance that there are an almost limitless (limited due to memory and processing constraints) supply of devices. Each device from the application's perspective is opened and processed by the pseudo device driver, which uses the session id encoded within the device name to direct all requests for the same type of device to the same daemon. This daemon in turn uses the single actual device node in the operating system for processing of these requests.

Other embodiments include methods for providing communication between an application and a device includes: initiating a session between a user and a device, launching a daemon associated with the session, requesting a session ID for the session from a pseudo device driver (PDD), generating session structures for the device, forwarding the session ID to the daemon; producing a device name (also referred to as a device node) which includes a relationship to the session ID for each session, setting environmental variables associated with the session to identify the device to the application; and communicating between the application and the device by way of the daemon and the PDD. The device node is produced using a major number associated with the device and a minor number indicating which device of the device type, and the major number and minor numbers are formatted to include the session ID within the device node.

Other embodiments include a computer readable medium having computer readable code thereon for providing communication between an application and a device includes. The computer readable code includes instructions for initiating a session between a user and a device, instructions for launching a daemon associated with the session, instructions for requesting a session ID for the session from a pseudo device driver (PDD), instructions for generating session structures for the device, instructions for forwarding the session ID to the daemon; instructions for producing a device node which includes a relationship to the session ID for each session, instructions for setting environmental variables associated with the session to identify the device to the application; and instructions for communicating between the application and the device by way of the daemon and the PDD. The computer readable medium further includes instructions for producing the device node using a major number associated with the device and a minor number indicating which device of the device type, and formatting the major number and minor numbers to include the session ID within the device node.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides communication between a device and an user as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing communication between a device and a user as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Sun Microsystems, Inc. of Santa Clara, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates an example computer system architecture for a host computer system that performs a store process in accordance with embodiments of the invention.

DETAILED DESCRIPTION

Embodiments of the invention provide a system that allows a user application to communicate with multiple devices while avoiding the conventional limitation of having a maximum number of minor devices associated with a major device number within operating systems such as Linux that use major/minor device identification schemes.

Figure 1:
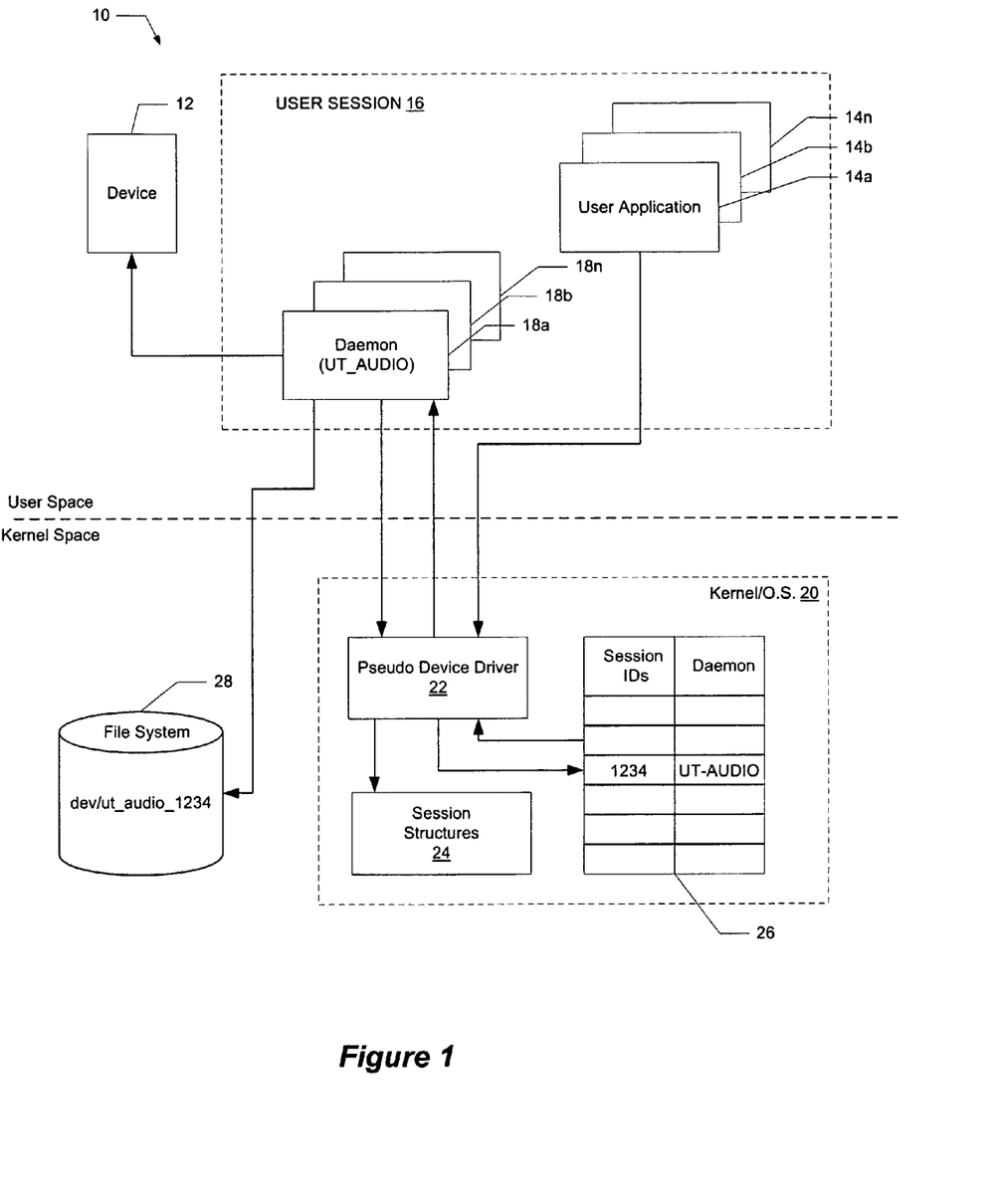
FIG. 1 is a block diagram of an environment for providing communication between a device and a user.

Referring now to FIG. 1, a particular embodiment of an environment 10 is shown wherein communication is established between a device 12 and a user application 14a. The user session 16 includes one or more user applications 14a-14n and user session daemons 18a-18n. A session is initiated, for example, by a user logging in and accessing (i.e., executing) a user application 14a-14n. A particular user application 14a is in communication with a pseudo device driver (PDD) 22 associated with the session as will be explained. The user session daemon (herein after the daemon) may also be launched at session initiation or login. The user session daemon 18 is installed that will operate in conjunction with the pseudo device driver 22 as explained herein Upon startup, the daemon 18a requests a session identification number (ID) for the user session 16 from the PDD 22. The session ID is unique for each session. A system may have multiple sessions running at the same time. The PDD 22 resides within the Kernel/OS 20, such as Linux and manages the session identifications. In response to receiving the request for a session ID, the PDD 22 generates session structures 24 that are used to buffer application requests while they are forwarded to the appropriate daemon. In response to the request, the PDD 22 searches through a session ID data structure 26 to determine a next unused session ID. The PDD selects the next unused session ID (e.g., 1234) and marks it in the data structure as "in use". The session ID is then forwarded back to the requesting daemon 18a by the PDD 22.

The daemon then creates a device node which includes a relationship to the session ID. In one embodiment, the relationship is that the name of the device node contains the session id. The device node may be stored as device file in a file system 28 and may be created, for example, using the "mknod" command in Linux. In conventional systems, the device node is based on a major number identifying a particular device type, and a minor number indicating which device of the device type. In a particular embodiment of providing communications between a device and a user, the major number and minor number are formatted to provide a device node which has the session ID encoded therein, thereby eliminating the restriction regarding the number of devices of a particular device type that the system can access. The user session daemon receives the session ID from the pseudo device driver and proceeds to create a device node within device directory used for storing device nodes (i.e., devices in the Linux device directory) of the type associated with the user session daemon. As an example, if the user session daemon controls access to audio devices on behalf of user applications operating within the user session, the user session daemon creates a single device node in the audio device directory having a device node name that includes the session id. As an example, for an audio device, the user session daemon can create a device /dev/audio/ut_audio__1234 (i.e., with the command mknod/dev/audio/ut_audio__1234, 14, 1), where the "1234" part of the device name is the session id assigned to the user session daemon from the pseudo device driver and wherein the 14 is the major number and 1 is the minor device number.

In addition, the user session daemon applies any user permissions associated with the user session to the newly create device and further establishes or sets environment variables associated with the session to identify the new device to any user applications operating within the user session. In particular, environmental variables associated with the user session 16 are set by the daemon and are used to identify the device 12 to the application 14a. An example, if user applications 14 expect to access audio devices by using the environment variable "AUDIO", then the user session daemon sets the environment variable "AUDIO" to be equivalent to device node /dev/audio/ut_audio__1234. Note that the user session daemon only is required to create a single Linux device of the appropriate type and can use this device over and over no matter how many devices a particular user application may require. As an example, if a particular user application within a session required 500 audio devices, the user session daemon could establish 500 different environment variables "AUDIO__1" . . . "AUDIO__500" and can assign each one to the same Linux device node /dev/audio/ut_audio__1234.

With such an arrangement communicating between the user application 14a and the device 12 occurs by way of daemon 18a and the PDD 22. Since the device node includes the session ID, the restriction regarding the number of devices the system can access is eliminated. For example, multiple session may want to use the same audio device and the same daemon (UT_AUDIO). The PDD acts as a type of switch between the sessions, one session referencing a device node including a first session ID (e.g., dev/audio/1234), and a second device node having a second session ID (e.g., dev/audio/2345). The PDD receives the audio data and determines by way of the session ID which daemon to forward the audio data to.

In other words, once the configuration phase is completed and the daemon has created the device including the session identification, user applications operating within the user session can execute system calls for access to devices associated with the user session daemon via the appropriate user session environment variables. As an example, the user application can initiate a request to the Linux kernel to open and access a first audio device AUDIO1 (equal to device node /dev/ut_audio__1234) within a session via referencing the environment variable AUDIO1. As part of the system call, the user application specifies the major and minor device number (14,1) that were assigned to this device upon the creation of the device by the user session daemon. When the Linux kernel receives such a request, the kernel finds the device driver associated with the requesting device, which in this case is the pseudo device driver, and passes control to the pseudo device driver operating in accordance with embodiments of the invention. The pseudo device driver receives the system call and is able to examine the system call made by the user application to identify the device name /dev/audio/ut_audio__1234. By parsing this device name, the pseudo device driver is able to identify the session identification number "1234" and is able to use this session identification number to identify the appropriate user session daemon to process the user application system request for access to the device. In other words, since the device access request made by a user application identifies a device by name and has the session identification encoded within the device name, the pseudo device driver is able to identify which user session and hence which user session daemon will be processing requests for the particular device. Accordingly, the pseudo device driver responds to the kernel and the Linux kernel establishes a connection between the pseudo device driver and the requesting application such that the requesting application can access the device (e.g., by reading and writing data to or from the device via the pseudo device driver). Any data sent to or from the pseudo device driver by the user application is forwarded to the appropriate user session daemon (identified by the session id encoded within the device name) and the user session daemon is able to access the device based on the data received from the pseudo device driver.

In this manner, embodiments of the invention are able to provide a user session daemon that only creates a single actual Linux device node for a user session within the Linux device directory and encodes within this device name the session identification associated with the user session. Thereafter, the user session daemon can establish or associate any number of system environment variables for any number of pseudo devices for use by user applications for access to any number of devices. Since each environment variable references the same actual Linux device (i.e., major 14, minor 1) and this device name (i.e., /dev/audio/ut_audio 1234) includes the session identification formerly established between the user session daemon and the pseudo device driver, any user application system requests for access to these devices from the user applications are directed to the same pseudo device driver which can, based upon the device name, map the device access request back the appropriate user session daemon via the session ID data structure maintained by the pseudo device driver. Accordingly, any number of devices may now be requested for access by user applications and the conventional Linux limitation of 256 devices associated with a particular device type is overcome by embodiments of the invention.

Figure 2:
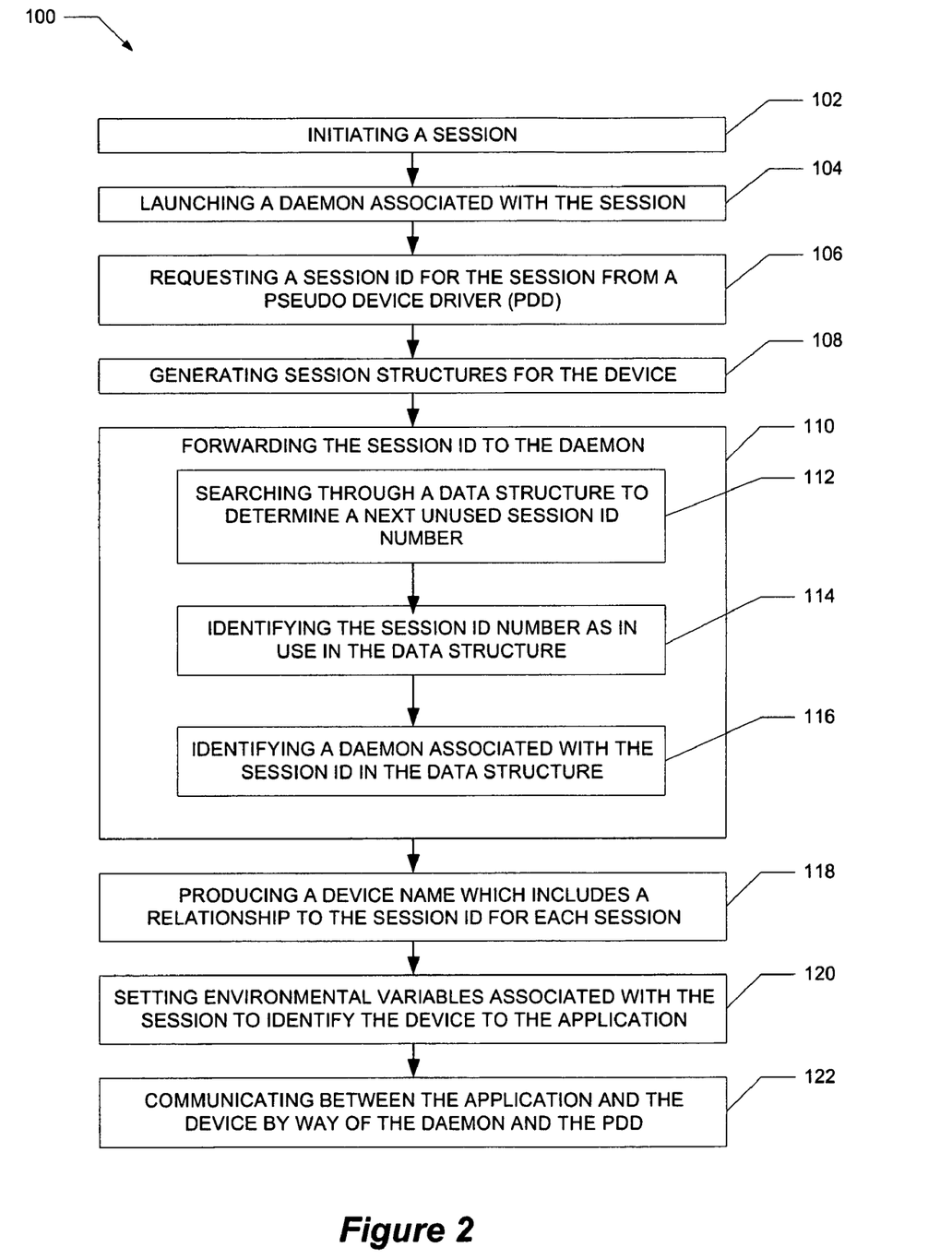
FIG. 2 is a flow chart of a method for providing communication between a device and a user.

A flow chart of the presently disclosed method is depicted in FIG. 2 The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a method 100 of providing communication between a device and a user application is shown. The method starts with processing block 102 which states that a session is initiated. A session is initiated, for example, by a user logging in and accessing a user application.

Processing block 104 discloses that a daemon is launched. The daemon is associated with the session. The daemon communicates with the user application and with the pseudo device driver.

Processing block 106 recites that a session ID is requested from a pseudo device driver (PDD). The pseudo device driver is part of the Kernel/OS.

Processing block 108 discloses that session structures are generated for the device.

Processing block 110 states that the session ID is forwarded to the daemon 18. Processing block 112 recites that the session ID is determined by searching through a data structure to determine a next unused session ID number. As shown in processing block 114, the session ID is identified as "in use" in the data structure, such that another session is prevented from using the same session ID. Processing block 116 recites that a daemon is identified which is associated with said session ID in said data structure.

Processing block 118 discloses that a device node is produced (i.e., by the daemon) which includes a relationship to the session ID for each session (e.g., dev/audio/1234). The relationship is that the device name includes the session id in one example embodiment.

Processing block 120 states that environmental variables associated with the session are set to identify the device and the application. The daemon 18 performs this operation after creating the device.

Processing block 122 recites that communication between the application and the device by way of the daemon and the PDD is enabled. In such a manner, the method incorporates a session ID into the device node, such that the previous restriction regarding the number of devices of a particular device type is eliminated. In particular, user applications 14 operating within the user session 16 can execute system calls for access to devices within the file system 28 associated with the user session daemon via the appropriate user session environment variables. As an example, the user application can initiate a request to the Linux kernel 20 to open and access a first audio device AUDIO1 (equal to /dev/ut_audio__1234 in the file system 28) via referencing the environment variable AUDIO 1. As part of the system call, the user application 14 specifies the major and minor device number (14,1) that were assigned to this device upon the creation of the device by the user session daemon 18. When the Linux kernel receives such a request, the kernel 20 finds the device driver associated with the requesting device, which in this case is the pseudo device driver 22, and passes control to the pseudo device driver 22 operating in accordance with embodiments of the invention.

The pseudo device driver 22 receives the system call (e.g., to open a device) and is able to examine the system call made by the user application 14 to identify the device named /dev/audio/ut_audio__1234. By parsing this device name, the pseudo device driver 22 is able to identify the session identification number "1234" and is able to use this session identification number to identify the appropriate user session daemon 18 to process the user application system request for access to the device. In other words, since the device access request made by a user application 14 is made to the kernel 20 via the environment variable that identifies a device by name and has the session identification encoded within the device name, the pseudo device driver 22 is able to identify which user session (i.e., 1234) and hence which user session daemon (i.e., 18a in this example) will be processing requests for access to the audio device by the user application 14a. Accordingly, the pseudo device driver 22 responds to the kernel 20 and the Linux kernel establishes a connection between the daemon 18a and the requesting application 14 via the device driver 22 such that the requesting application can access the device (e.g., by reading and writing data to or from the device via the pseudo device driver). Any data sent to or from the pseudo device driver 22 by the user application is forwarded to the appropriate user session daemon 18a (identified by the session id encoded within the device name) and the user session daemon 18a is able to access to device based on the data received from the pseudo device driver.

Figure 3:
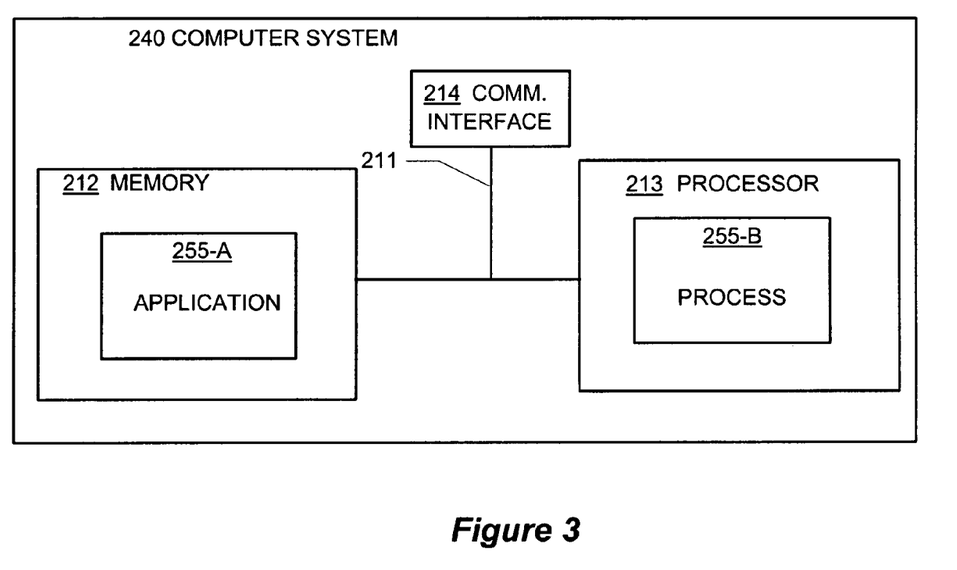
FIG. 3 is a flow chart of another method for providing communication between a device and a user.

Referring now to FIG. 3, example architectures of a computer system that is configured as a host computer system 240 are shown. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the agent process 255-B represents one or more portions of the agent application 255-A performing within or upon the processor 213 in the computer system. It is to be understood that the agent 255 operate as explained in former examples are represented in FIG. 5 by the agent application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of establishing communication between an application and a device comprising:
   initiating a session;
   launching a daemon associated with said session;
   requesting a session ID for said session from a pseudo device driver (PDD);
   generating session structures for the device;
   forwarding the session ID to said daemon;
   producing a device node, with said daemon, the device node includes the session ID;
   assigning, with said daemon, an environmental variable to said device node to identify said device to said application; and
   communicating between said application and said device by way of said daemon and said PDD, wherein communicating between said application and said device comprises:
     receiving a request to access said device from said application associated with said session via said application referencing the environment variable;
     parsing the request to identify said daemon associated with said session to process the request based on a session ID indicated within the identity of said device node as specified in the request to access said device; and
     forwarding the request to the identified daemon to allow said application to access said device via said device node.

2. The method of claim 1 wherein said producing a device node comprises using a major number associated with a device type of said device and a minor number indicating said device and a function of said device, and formatting a device name associated with said major number and minor number to include the session ID.

3. The method of claim 1 wherein said forwarding a session ID to said daemon comprises searching through a data structure to determine a next unused session ID number.

4. The method of claim 3 further comprising identifying said session ID number as in use in said data structure and identifying said daemon associated with said session ID in said data structure.

5. The method of claim 1 wherein: the application requires access to a number of separate devices of a predefined type that exceeds a number of devices that can be created of the predefined type allowed by an operating system supporting the user session.

6. A method of establishing communication between an application and a device comprising;
   initiating a session;
   launching a daemon associated with said session;
   requesting a session ID for said session from a pseudo device driver (PDD);
   generating session structures for the device;
   forwarding the session ID to said daemon by searching through a data structure to determine a next unused session ID, identifying the session ID as in use in said data structure, and identifying said daemon associated with said session ID in said data structure;
   producing a device node using a major number associated with a device type of said device and a minor number indicating said device and a function of said device, and formatting said major number and minor number to include the session ID;
   assigning an environmental variable to said device node to identify said device to said application; and
   communicating between said application and said device by way of said daemon and said PDD, wherein communicating between said application and said device comprises:
     receiving a request to access said device from said application associated with said session via the application referencing the environment variable;
     parsing the request to identify said daemon associated with said session to process the request based on a session ID indicated within the identity of said device node as specified in the request to access said device; and
     forwarding the request to the identified daemon to allow said application to access said device via said device node.

7. A method for accessing a device, the method comprising:
   detecting a requirement to access a device during a user session;
   obtaining a session identification associated with the user session;
   creating a single device node with a daemon, the single device node having the session identification that is associated with the user session;
   assigning with the daemon, an environmental variable to the single device node to identify the device to an application;
   receiving a request to access the device from the application associated with the user session via the environmental variable;
   parsing the request to identify the daemon associated with the user session to process the request based on the session identification specified in the request to access the device; and forwarding the request to the identified daemon to allow the application to access the device via the single device node;

wherein the application requires access to a number of separate devices of a predefined type that exceeds a number of devices that can be created of a predefined type allowed by an operating system supporting the user session.

8. A computer program product having a readable memory device including computer program logic instructions encoded thereon that, when performed on a processor in a computerized device provides a method for performing the operations of:

instructions for initiating a session;

instructions for launching a daemon associated with said session;

instructions for requesting a session ID for said session from a pseudo device driver (PDD);

instructions for generating session structures for the device;

instructions for forwarding the session ID to said daemon;

instructions for producing, with said daemon, a device node that includes the session ID;

instructions for assigning, with said daemon, an environmental variable to said device node to identify said device to said application; and instructions for communicating between said application and said device by way of said daemon and said PDD, wherein instructions for communicating between said application and said device comprises:

instructions for receiving a request to access said device from said application associated with said session via said application referencing the environment variable;

instructions for parsing the request to identify said daemon associated with said session to process the request based on a session ID indicated within the identity of said device node as specified in the request to access said device; and instructions for forwarding the request to the identified daemon to allow said application to access said device via said device node.

9. The computer readable medium of claim 8 wherein said instructions for producing a device node comprise instructions for using a major number associated with a device type of said device and a minor number indicating said device and a function of said device, and instructions for formatting said major number and minor number to include the session ID.

10. The computer readable medium of claim 8 wherein said instructions for forwarding a session ID to said daemon comprise instructions for searching through a data structure to determine a next unused session ID number.

11. The computer readable medium of claim 10 further comprising instructions for identifying said session ID number as in use in said data structure.

12. The computer readable medium of claim 10 further comprising instructions for identifying a daemon associated with said session ID in said data structure.

13. A computer program product having a computer readable memory device including computer program logic instructions encoded thereon that, when performed on a processor in a computerized device provides a method for performing the operations of:

detecting a requirement to access a device during a user session;

obtaining a session identification associated with the user session;

creating a single device node with a daemon, the single device node having the session identification that is associated with the user session;

assigning, with the daemon, an environmental variable to the single device node to identify said device to an application;

receiving a request to access the device from the application associated with the user session via the application referencing the environmental variable;

parsing the request to identify the daemon associated with the user session to process the request based on the session identification specified in the request to access the device; and forwarding the request to the identified daemon to allow the application to access the device via the single device node;

wherein the application requires access to a number of separate devices of a Predefined type that exceeds a number of devices that can be created of a predefined type allowed by an operating system supporting the user session.

14. A computer program product having a computer readable memory device including computer program logic instructions encoded thereon that, when performed on a processor in a computerized device provides a method for performing the operations of:

instructions for initiating a session;

instructions for launching a daemon associated with said session;

instructions for requesting a session ID for said session from a pseudo device driver (PDD);

instructions for generating session structures for the device;

instructions for forwarding the session ID to said daemon by searching through a data structure to determine a next unused session ID, instructions for identifying the session ID as in use in said data structure, and instructions for identifying a daemon associated with said session ID in said data structure;

instructions for producing, with said daemon, a device node with a major number associated with a device type of said device and a minor number indicating said device and a function of said device, and instructions for formatting said major number and minor number to include the session ID;

instructions for setting, with said daemon, an environmental variable to said device node to identify said device to an application; and instructions for communicating between said application and said device by way of said daemon and said PDD, wherein instructions for communicating comprises:

instructions for receiving a request to access said device from said application associated with said session via said application referencing the environment variable;

instructions for parsing the request to identify said daemon associated with said session to process the request based on a session ID indicated within the identity of said device node as specified in the request to access said device; and instructions for forwarding the request to the identified daemon to allow said application to access said device via the said device node.

15. A computer system comprising:

a memory;

a processor;

a communications interface;

an interconnection mechanism coupling the memory, the processor and the communications interface; and wherein the memory is encoded with an application that when performed on the processor, provides a process for processing information, the process causing the computer system to perform the operations of:

initiating a session;

launching a daemon associated with said session;

requesting a session ID for said session from a pseudo device driver (PDD);

generating session structures for the device;

forwarding the session ID to said daemon;

producing a device node that includes the session ID;

setting an environmental variable to said device node to identify said device to said application; and communicating between said application and said device by way of said daemon and said PDD, wherein communicating between said application and said device comprises:

receiving a request to access said device from said application associated with said session via said application referencing the environment variable;

parsing the request to identify said daemon associated with said session to process the request based on a session ID indicated within the identity of said device node as specified in the request to access said device; and forwarding the request to the identified daemon to allow said application to access said device via said device node.

16. The computer system of claim 15 wherein said process causing the computer system to perform the operation of producing a device node comprises using a major number associated with a device type of said device and a minor number indicating said device and a function of said device, and formatting said major number and minor number to include the session ID.

17. The computer system of claim 16 wherein the process causes the computer system to perform the operation of identifying said session ID number as in use in said data structure.

18. The computer system of claim 16 wherein the process causes the computer system to perform the operation of identifying a daemon associated with said session ID in said data structure.

19. The computer system of claim 15 wherein said process causing the computer system to perform the operation of forwarding a session ID to said daemon comprises searching through a data structure to determine a next unused session ID number.

20. A computer system comprising:

a memory;

a processor;

a communications interface;

an interconnection mechanism coupling the memory, the processor and the communications interface; and wherein the memory is encoded with an application that when performed on the processor, provides a process for processing information including:

means for initiating a session;

means for launching a daemon associated with said session;

means for requesting a session ID for said session from a pseudo device driver (PDD);

means for generating session structures for the device;

means for forwarding the session ID to said daemon by searching through a data structure to determine a next unused session ID, identifying the session ID as in use in said data structure, and identifying a daemon associated with said session ID in said data structure;

wherein said daemon produces a device node with a major number associated with a device type of said device and a minor number indicating said device and a function of said device, formats said major number and minor number to include the session ID, and assigns an environmental variable to said device node to identify said device to said application; and means for communicating between said application and said device by way of said daemon and said PDD, wherein means for communicating comprises:

means for receiving a request to access said device from said application associated with said session via said application referencing the environment variable;

means for parsing the request to identify said daemon associated with said session to process the request based on a session ID indicated within the identity of said device node as specified in the request to access said device; and means for forwarding the request to the identified daemon to allow said application to access said device via said device node.

21. A computer system comprising:

a memory;

a processor;

a communications interface;

an interconnection mechanism coupling the memory, the processor and the communications interface; and wherein the memory is encoded with an agent application that when performed on the processor, provides an agent process for processing management information, the agent process causing the computer system to perform the operations of:

detecting a requirement to access a device during a user session;

obtaining a session identification associated with the user session;

creating a single device node with a daemon, the single device node having the session identification that is associated with the user session;

assigning with the daemon, an environmental variable to the single device node to identify the device to an application;

receiving a request to access the device from the application associated with the user session via the application referencing the environmental variable;

parsing the request to identify the daemon associated with the user session to process the request based on the session identification specified in the request to access the device;

forwarding the request to the daemon to allow the application to access the device via the single device node; and wherein the application requires access to a number of separate devices of a predefined type that exceeds a number of devices that can be created of a predefined type allowed by an operating system supporting the user session.

* * * * *

UNITED STATES PATENT AND TRADEMARK OFFICE
CERTIFICATE OF CORRECTION

PATENT NO. : 7,590,986 B1  Page 1 of 1
APPLICATION NO. : 10/881552
DATED : September 15, 2009
INVENTOR(S) : Doraisamy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1477 days.

Signed and Sealed this

Twenty-first Day of September, 2010

David J. Kappos
*Director of the United States Patent and Trademark Office*